United States Patent
Lin et al.

(10) Patent No.: US 10,860,149 B2
(45) Date of Patent: Dec. 8, 2020

(54) TOUCH PANEL WITH ELECTROMAGNETIC INDUCTION

(71) Applicants: Interface Technology (ChengDu) Co., Ltd., Chengdu (CN); Interface Optoelectronics (ShenZhen) Co., Ltd., Shenzhen (CN); General Interface Solution Limited, Zhunan (TW)

(72) Inventors: Bo-Rong Lin, Zhunan (TW); Hsuan-Yun Lee, Zhunan (TW); Ching-Lin Li, Zhunan (TW)

(73) Assignees: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/426,704

(22) Filed: May 30, 2019

(65) Prior Publication Data

US 2020/0341567 A1 Oct. 29, 2020

(30) Foreign Application Priority Data

Apr. 26, 2019 (CN) .......................... 2019 1 0344287

(51) Int. Cl.
*G06F 3/041* (2006.01)
*G06F 3/044* (2006.01)
(Continued)

(52) U.S. Cl.
CPC .......... *G06F 3/044* (2013.01); *G02F 1/13338* (2013.01); *G02F 1/133308* (2013.01);
(Continued)

(58) Field of Classification Search
CPC ................. G06F 3/044; G06F 3/04162; G02F 1/133308; G02F 1/13338; G02F 1/133603; G02F 2001/133612
See application file for complete search history.

(56) References Cited

U.S. PATENT DOCUMENTS

| | | | |
|---|---|---|---|
| 7,084,933 B2 * | 8/2006 | Oh | G02F 1/13338 178/18.03 |
| 2013/0188395 A1 * | 7/2013 | Zhou | G02B 6/0011 362/623 |

(Continued)

FOREIGN PATENT DOCUMENTS

| | | | | |
|---|---|---|---|---|
| CN | 209232323 U | * | 8/2019 | ............... G09F 9/33 |
| KR | 20060071869 | * | 7/2012 | ............. H01L 33/00 |
| TW | M321154 | * | 10/2007 | ............... H01Q 5/00 |

*Primary Examiner* — Chanh D Nguyen
*Assistant Examiner* — Derik John Trumble
(74) *Attorney, Agent, or Firm* — Muncy, Geissler, Olds and Lowe, P.C.

(57) ABSTRACT

A touch panel with electromagnetic induction function comprising a light-emitting diode backlight layer, an electromagnetic antenna, a display panel layer, a touch panel layer and a protective layer. The light emitting diode backlight layer has a plurality of light emitting diode units. The electromagnetic antenna is disposed on the backlight layer for emitting an alternating electromagnetic field and receiving a resonance signal. The display panel layer is disposed on the backlight layer. The touch panel layer is disposed on the display panel layer for capacitive touch. The protective layer is disposed on the touch panel layer to protect the touch panel layer. An electromagnetic pen for electromagnetic touch is configured to receive the alternating electromagnetic field and then emit the resonance signal.

12 Claims, 3 Drawing Sheets

(51) Int. Cl.
*G02F 1/13357* (2006.01)
*G02F 1/1333* (2006.01)

(52) U.S. Cl.
CPC .... *G02F 1/133603* (2013.01); *G06F 3/04162* (2019.05); *G02F 2001/133612* (2013.01)

(56) References Cited

U.S. PATENT DOCUMENTS

| | | | |
|---|---|---|---|
| 2016/0276744 A1* | 9/2016 | Manzi | H01Q 7/06 |
| 2020/0066687 A1* | 2/2020 | Kim | H01L 33/62 |

\* cited by examiner

TOUCH PANEL WITH ELECTROMAGNETIC INDUCTION

BACKGROUND OF THE INVENTION

Field of the Invention

The present invention relates to a touch panel, and more particularly to a touch panel with electromagnetic induction that reduces an antenna layer, reduces manufacturing cost, and decreases product thickness.

Description of the Prior Art

Conventional electromagnetic touch panel are expensive, but are sensitive, and have high transmittance, high resolution, high environmental tolerance, and Z-axis sensing capability. Touch panels can be used for handwriting recognition and drawing. The screen doesn't have to be touched in order to interact with the touch panel. Although it is not possible to penetrate into the general public market due to price factors, touch panels have many applications in the industrial computer field.

The principle of electromagnetic sensing is that the antenna layer emits an alternating electromagnetic field, and the electromagnetic pen has a resonant circuit. When the electromagnetic pen receives the energy of the alternating electromagnetic field emitted by the antenna layer, the electromagnetic pen and the alternating electromagnetic field signal resonate, and the antenna layer receives the resonance signal again to calculate the stroke position. Under the existing architecture, the antenna layer and the electromagnetic pen have a two-wire antenna, and a metal layer must be placed under the antenna layer to shield the signal.

However, with the conventional architecture in which the sub-millimeter LED (mini LED) backlight touch module is equipped with an electromagnetic pen function, the overall thickness is relatively thick and the manufacturing cost is high.

Therefore, in order to solve the above problems and overcome the disadvantages of the conventional technology, the present invention provides an electromagnetic induction touch panel that reduces an antenna layer, reduces manufacturing cost, and decreases product thickness.

SUMMARY OF THE INVENTION

Therefore, in view of the above-mentioned deficiencies, the inventors of the present invention have collected relevant materials, and have evaluated and considered such patents through continuous evaluation and modification through multi-party evaluation and consideration, and through years of experience in the industry.

It is an object of the present invention to provide a touch panel having an electromagnetic induction function that reduces an antenna layer in order to achieve a reduction in manufacturing cost and product thickness.

To achieve the above and other objects, the present invention provides an electromagnetic induction touch panel comprising: a light emitting diode backlight layer comprising a plurality of light emitting diodes (LED); an electromagnetic antenna disposed on the light emitting diode backlight layer; a display panel layer disposed on the light emitting diode backlight layer; a touch panel layer disposed on the display panel layer for capacitive touch functions; a protective layer disposed on the touch panel layer for protection from an electromagnetic pen for electromagnetic touch, wherein the electromagnetic pen is configured to receive the alternating electromagnetic field and then emit the resonant signal.

In a preferred embodiment, the plurality of light emitting diode units are arranged in an array on the light emitting diode backlight layer.

In a preferred embodiment, the plurality of LED units are sub-millimeter LED (mini LED) units.

In a preferred embodiment, the electromagnetic antenna is disposed on the light emitting diode backlight layer.

In a preferred embodiment, the electromagnetic antenna is disposed inside the light emitting diode backlight layer.

In a preferred embodiment, the electromagnetic antenna is disposed between the plurality of light emitting diode units, and the plurality of light emitting diode units have a spacing therebetween. The electromagnetic antenna has a line width, and the width of the spacing is greater than the width of the line width.

In a preferred embodiment, the plurality of light emitting diode units are driven by DC power.

In a preferred embodiment, the display panel layer is a liquid crystal display panel.

DESCRIPTION OF THE PREFERRED EMBODIMENTS

In order to achieve the above objects and effects, the technical means and the structure of the present invention will be described in detail with reference to the preferred embodiments of the present invention.

Figure 1:
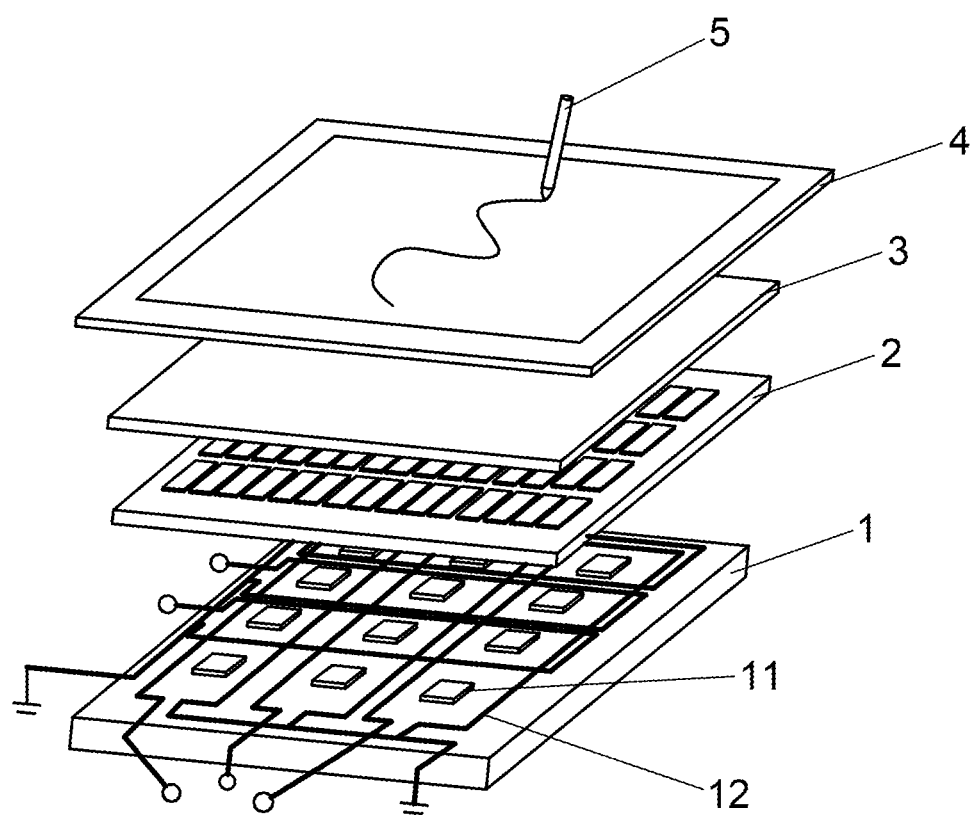
FIG. 1 is an exploded perspective view of a touch panel having an electromagnetic induction function according to an embodiment of the present invention.
Figure 2:
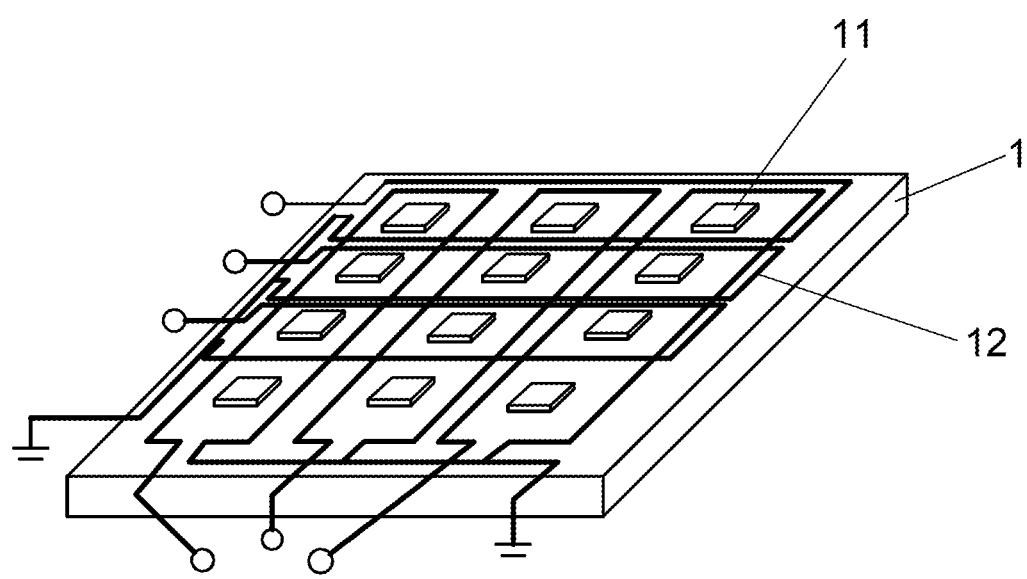
FIG. 2 is a partial schematic view of a touch panel with electromagnetic induction function according to an embodiment of the present invention.
Figure 3:
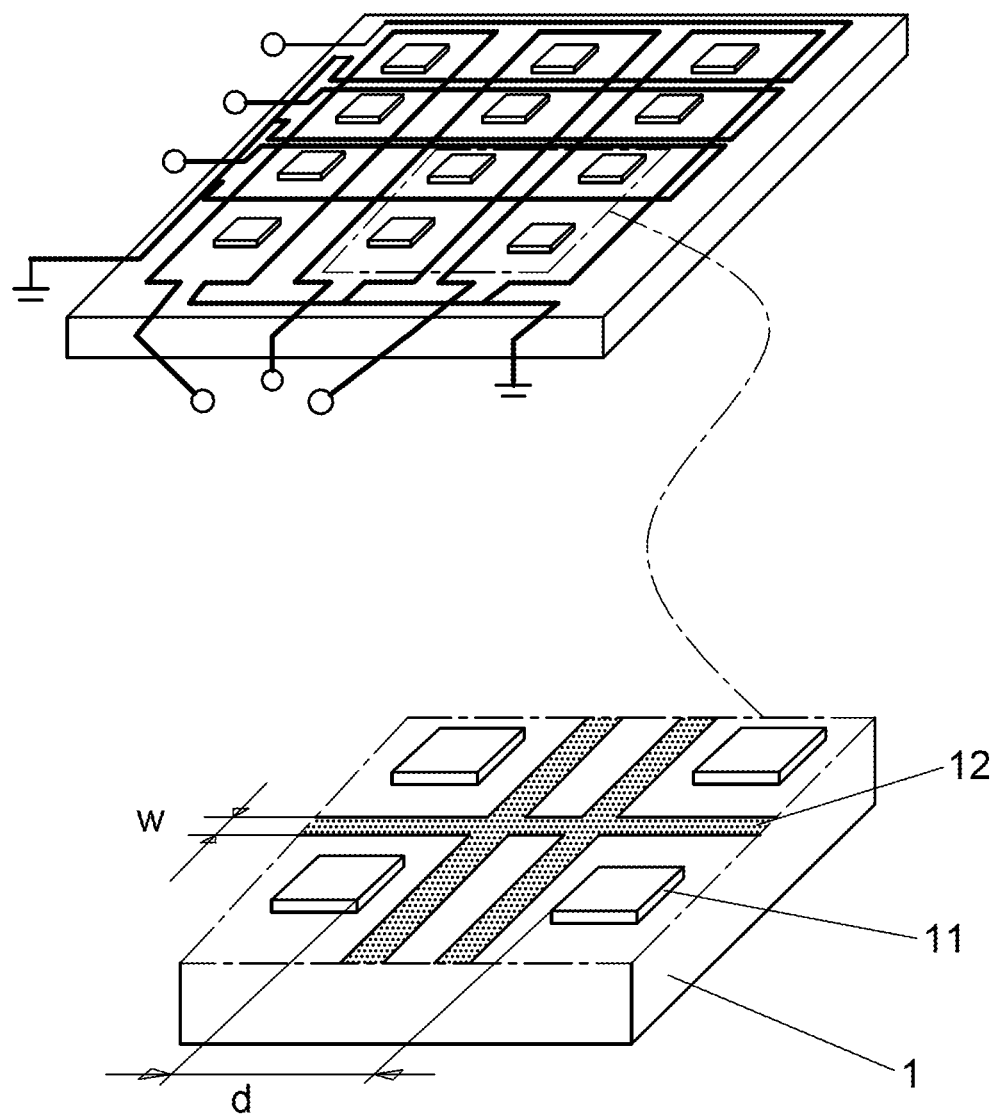
FIG. 3 is a partial schematic view of a touch panel with electromagnetic induction function according to an embodiment of the present invention.

Refer to FIG. 1, FIG. 2, and FIG. 3, which are perspective exploded views, partial schematic views 1 and 2 of a preferred embodiment of an electromagnetic induction touch panel according to the present invention. It can be clearly seen from the figures that the touch panel with electromagnetic induction function comprises: a light-emitting diode backlight layer 1, an electromagnetic antenna 12, a display panel layer 2, a touch panel layer 3, and a protective layer 4.

The light-emitting diode backlight layer 1 has a plurality of light-emitting diode units 11. In an embodiment, the plurality of light-emitting diode units 11 are arranged in an array on the light-emitting diode backlight layer 1, and the plurality of light-emitting elements are illuminated. The diode unit 11 is a sub-millimeter light emitting diode (Mini LED) unit.

The electromagnetic antenna 12 is disposed on the LED backlight layer 1 for emitting an alternating electromagnetic field and receiving a resonance signal. In an embodiment, the electromagnetic antenna 12 is disposed on the light emitting diode backlight layer 1. However, if the light-emitting diode backlight layer 1 is disposed as a multi-layer structure, the electromagnetic antenna 12 may also be disposed inside the light-emitting diode backlight layer 1, that is, the electromagnetic antenna 12 and the plurality of light-emitting diode units 11 are not on the same layer. The present invention does not limit the position at which the electromagnetic antenna 12 is disposed on the light-emitting diode backlight layer 1.

The electromagnetic antenna 12 is disposed between the plurality of light emitting diode units 11. The plurality of light emitting diode units 11 have a distance "d" (d) between each unit and the electromagnetic antenna 12 has a line width "w" (w). The distance d is greater than the line width w.

The display panel layer 2 is disposed on the LED backlight layer 1. The display panel layer 2 is used to display a screen. In an embodiment, the display panel layer 2 is a liquid crystal display panel, but is not limited thereto.

The touch panel layer 3 is disposed on the display panel layer 2 for capacitive touch input. In an embodiment, the touch panel layer 3 can sense the position of the user or user device in order to perform capacitive touch functions.

The protective layer 4 is disposed on the touch panel layer 3 for protecting the touch panel layer from an electromagnetic pen 5 having electromagnetic touch functions. The electromagnetic pen 5 is configured to receive the alternating electromagnetic field and then emit the resonance signal. The protective layer 4 is used to protect the touch panel with electromagnetic induction function and allows the user to perform capacitive touch and electromagnetic touch functions.

With the above structure and composition design, use of the present invention is described as follows. When the user wants to use the electromagnetic pen 5, the pen is moved over the protective layer 4. At this time, the electromagnetic pen 5 receives the alternating electromagnetic field emitted by the antenna 12. After receiving the electromagnetic alternating field signal, the electromagnetic pen 5 emits a resonance signal based upon the alternating electromagnetic field signals. The electromagnetic antenna 12 receives the resonance signal and determines the stroke position of the electromagnetic pen 5.

The present invention provides a sub-millimeter light-emitting diode (mini LED) backlight touch module, and utilizes the characteristics of the array arrangement of the sub-millimeter light-emitting diodes to be redundant on the light-emitting diode backlight layer 1. The electromagnetic antenna 12 is spatially arranged to reduce the thickness and cost of fabricating the electromagnetic antenna layer, and its layout also eliminates the need for a metal shield (shielding) layer.

In addition, the complex LED units 11 of the present invention are driven by DC power in order to avoid interference with the antenna signal of the electromagnetic pen 5.

Therefore, referring to all the drawings, when the present invention is used, compared with the conventional technology, the following advantages are realized: the touch panel with electromagnetic induction functions of the present invention reduces the antenna layer in order to achieve a reduction of manufacturing cost and decrease product thickness.

Through the above detailed description, it is fully demonstrated that the object and effect of the present invention are both progressive in implementation, highly industrially usable, and are new inventions not previously seen on the market, and fully comply with the invention patent requirements as applied in accordance with the law. The above is only the preferred embodiments of the present invention, and is not intended to limit the scope of the embodiments and the scope of the present invention. Those skilled in the art should be able to make combinations of equivalent substitutions and obvious variations and are intended to be included within the scope of the invention.

What is claimed is:

1. A touch panel with electromagnetic induction function, comprising:
    a light emitting diode backlight layer comprising a plurality of light emitting diode units;
    an electromagnetic antenna disposed on the light emitting diode backlight layer for emitting an alternating electromagnetic field and receiving a resonance signal;
    a display panel layer disposed on the light emitting diode backlight layer;
    a touch panel layer disposed on the display panel layer for capacitive touch;
    a protective layer disposed on the touch panel layer for protecting the touch panel layer from an electromagnetic pen configured to receive the electromagnetic field and then emit the resonance signal,
    wherein the electromagnetic antenna is disposed between the plurality of light emitting diode units, and the plurality of light emitting diode units have a distance between the units, and the electromagnetic antenna has a line width with a width less than the distance between the plurality of light emitting diode units.

2. The touch panel with electromagnetic induction function of claim 1, wherein the plurality of light emitting diode units are arranged on the light emitting diode backlight layer in an array.

3. The touch panel with electromagnetic induction function of claim 1, wherein the plurality of light emitting diode units comprises 1 mm light-emitting diode units.

4. The touch panel with electromagnetic induction function of claim 1, wherein the electromagnetic antenna is disposed on an outer surface of the light emitting diode backlight layer.

5. The touch panel with electromagnetic induction function of claim 1, wherein the electromagnetic antenna is disposed inside the light emitting diode backlight layer.

6. The touch panel with electromagnetic induction function of claim 1, wherein the plurality of light emitting diode units are driven by DC power.

7. The touch panel with electromagnetic induction function of claim 1, wherein the display panel layer comprises a liquid crystal display panel.

8. A touch panel with electromagnetic induction function, comprising:
    a light emitting diode backlight layer comprising a plurality of light emitting diode units;
    an electromagnetic antenna disposed on the light emitting diode backlight layer for emitting an alternating electromagnetic field and receiving a resonance signal;
    a display panel layer disposed on the light emitting diode backlight layer such that the electromagnetic antenna and the display panel layer are disposed on the same side of the light emitting diode backlight layer;
    a touch panel layer disposed on the display panel layer for capacitive touch;
    a protective layer disposed on the touch panel layer for protecting the touch panel layer from an electromagnetic pen configured to receive the electromagnetic field and then emit the resonance signal;
    wherein the electromagnetic antenna is disposed between the plurality of light emitting diode units, and the plurality of light emitting diode units have a distance between the units, and the electromagnetic antenna has a line width with a width less than the distance between the plurality of light emitting diode units.

9. The touch panel with electromagnetic induction function of claim 8, wherein the plurality of light emitting diode units are arranged on the light emitting diode backlight layer in an array.

10. The touch panel with electromagnetic induction function of claim 8, wherein the plurality of light emitting diode units comprises 1 mm light-emitting diode units.

11. The touch panel with electromagnetic induction function of claim 8, wherein the plurality of light emitting diode units are driven by DC power.

12. The touch panel with electromagnetic induction function of claim 8, wherein the display panel layer comprises a liquid crystal display panel.

* * * * *